`US007820768B2`

United States Patent
Stevens et al.

(10) Patent No.: US 7,820,768 B2
(45) Date of Patent: Oct. 26, 2010

(54) PROCESS FOR THE PREPARATION OF STORAGE-STABLE POLYAMIDOIMIDE RESINS AND COATING MATERIALS WHICH CONTAIN THEM

(75) Inventors: Guenter Stevens, Kempen (DE); Heinz Herlinger, Seckach (DE)

(73) Assignee: ALTANA Electrical Insulation GmbH (DE)

( * ) Notice: Subject to any disclaimer, the term of this patent is extended or adjusted under 35 U.S.C. 154(b) by 1364 days.

(21) Appl. No.: 11/192,330

(22) Filed: Jul. 28, 2005

(65) Prior Publication Data

US 2006/0025543 A1 Feb. 2, 2006

Related U.S. Application Data

(63) Continuation of application No. PCT/EP2004/000333, filed on Jan. 17, 2004.

(30) Foreign Application Priority Data

Jan. 30, 2003 (DE) ................. 103 03 635

(51) Int. Cl.
*C08G 18/60* (2006.01)
*C08G 69/48* (2006.01)
*C08F 283/04* (2006.01)
*C08L 77/00* (2006.01)
*C08L 79/08* (2006.01)

(52) U.S. Cl. ................. 525/419; 525/420; 525/424; 525/434; 525/436; 525/452

(58) Field of Classification Search ................. 525/420, 525/434, 436, 419, 424, 452
See application file for complete search history.

(56) References Cited

U.S. PATENT DOCUMENTS

| | | | |
|---|---|---|---|
| 3,803,100 A | 4/1974 | Izumi et al. | |
| 3,884,880 A | 5/1975 | Disque et al. | |
| 3,903,036 A | 9/1975 | Gruffaz et al. | |
| 4,374,221 A | 2/1983 | McGregor et al. | |
| 2004/0006174 A1 | 1/2004 | Tödter König et al. | |
| 2005/0211580 A1* | 9/2005 | Kaszubski et al. | .......... 206/223 |

FOREIGN PATENT DOCUMENTS

| | | | |
|---|---|---|---|
| DE | 1720356 | | 7/1971 |
| DE | 2203153 | | 9/1972 |
| DE | 3240934 | | 6/1983 |
| DE | 3241947 | | 6/1983 |
| DE | 10041943 | | 3/2002 |
| EP | 0315925 A1 | | 5/1989 |
| JP | 50090627 | | 7/1975 |
| JP | 51001595 | | 1/1976 |
| JP | 55080426 | * | 6/1980 |
| JP | 408291252 | * | 11/1996 |

* cited by examiner

*Primary Examiner*—Ana L Woodward
(74) *Attorney, Agent, or Firm*—Schwegman, Lundberg & Woessner, P.A.

(57) ABSTRACT

Process for the preparation of polyamidoimide resins, in which the centers of the polyamidoimide resins which are reactive toward moisture are reacted with one or more compounds of the following general H—X—$R^1$, in which, where X=oxygen, $R^1$ is a straight-chain or branched alkyl group having 1 to 6 carbon atoms, a cycloalkyl group having 3 to 6 carbon atoms or an aralkyl group and, where X=$NR^2$, $R^1$ is a straight-chain or branched alkyl group having 1 to 6 carbon atoms, a cycloalkyl group having 3 to 6 carbon atoms or an aralkyl group or an aryl group and $R^2$ is a straight-chain or branched alkyl group having 1 to 6 carbon atoms, an aralkyl group or an aryl group, or $R^1$ and $R^2$ together form a cycloalkyl radical having 4 or 5 methylene groups, it being possible for a methylene group to be replaced by oxygen or an $NR^3$ group, and $R^3$ being a straight-chain or branched alkyl group having 1 to 3 carbon atoms, and polyamidoimide coating materials which are prepared by the process.

6 Claims, 1 Drawing Sheet

US 7,820,768 B2

Figure 1:
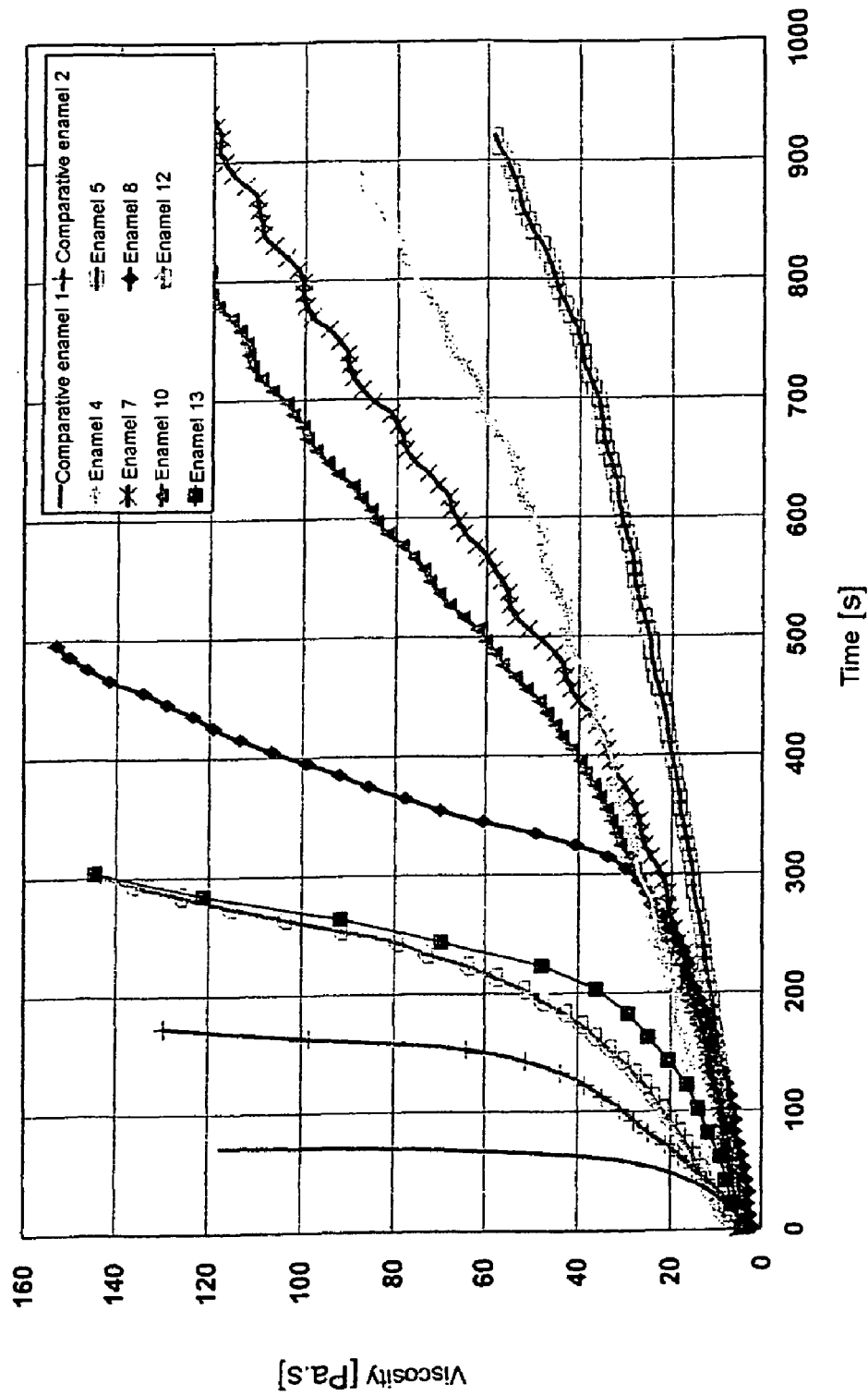

PROCESS FOR THE PREPARATION OF STORAGE-STABLE POLYAMIDOIMIDE RESINS AND COATING MATERIALS WHICH CONTAIN THEM

RELATED APPLICATIONS

This application is a continuation under 35 U.S.C. 111(a) of PCT/EP2004/000333, filed Jan. 17, 2004 and published as WO 2004/067596 A1, filed Aug. 12, 2004, which claimed priority under 35 U.S.C. 119 to German Application No. 103 03 635.0, filed Jan. 30, 2003, which applications and publication are incorporated herein by reference and made a part hereof.

The present invention relates to a process for the preparation of storage-stable polyamidoimide resins and polyamidoimide coating materials, which have high stability both during storage and during application, in particular to water and humidity.

BACKGROUND OF THE INVENTION

Polyamidoimides have already frequently been described in the literature as resin components of wire enamels. In this context, the polyamidoimides described in DE 2 203 153, EP 0 315 925 or DE 1 720 356 may be mentioned as examples.

However, the solutions of such polyamidoimide resins in dipolar aprotic solvents, such as dimethylformamide, dimethylacetamide, N-methylpyrrolidone, tetramethylurea or N,N'-dimethylethyleneurea, diluted with aromatic solvents, such as xylene and solvent naphtha, have a low storage stability. The literature discloses in particular the crystallization and gelling in combination with an increase in viscosity as disadvantages of such resins. In particular, symmetrical systems having amido-imido-imido-amido groups tend to crystallize. For this reason, the incorporation of further monomers, for example aliphatic and aromatic dicarboxylic acids, as co-components was described as a possible solution to the crystallization problem in some publications, such as, for example, in DE 2 203 153 and EP 0 315 925.

A further possibility for improving the storage stability was mentioned in DE 2 203 153 and consists in the use of mixtures of aromatic diamines, such as, for example, 2,4'- and 4,4'-diaminodiphenyl oxide (example 1 in DE 2 203 153) or of mixtures of 4,4'-diaminodiphenylmethane with 4,4'-diamino-3,3'-dimethyldiphenylmethane.

Mixtures of the isocyanate components, such as 4,4'-diisocyanatodiphenylmethane, together with industrial toluene diisocyanate were also used (example 6 of DE 2 203 153).

A further method for improving the storage stability and stability during enameling was described in DE 4 004 462. There, the enamels are protected from gelling by drying the polyamidoimide solution using a zeolite-based drying agent. However, the zeolite particles used in this process step have to be filtered off in order to avoid contamination of the enamel surface. This method is therefore another method which has disadvantages since the additional filtration step requires careful monitoring in order to avoid the deposition of particles on the coated wire.

EP 0 315 925 discloses that the molecular weight of polyamidoimides can be adjusted by adding monocarboxylic acids, such as formic acid, acetic acid or aromatic acids, such as benzoic acid, which are preferably intended to react with the active centers of the polyamidoimides.

Primary alcohols are described in the literature as further components for stabilizing polyamidoimides in order to prevent secondary reactions. With the processes disclosed in the literature, however, it is not possible to prepare storage-stable polyamidoimides, since low concentrations of active centers always remain in the enamels.

All abovementioned polyamidoimide coating materials and resins are unstable under storage and application conditions, in particular in the presence of relatively high humidity and temperature. It was therefore the object of the present invention to convert as far as possible all reactive centers of the polyamidoimides into groups which prevent crosslinking of the linear polymer in the presence of water or humid air. Suitable reactive centers in polyamidoimides, in addition to free isocyanates, are in particular isoimides, allophanates, biurets, uretdiones, carboxylic anhydrides and blocked isocyanates. The prevention of crosslinking is all the more important since even a few crosslinkings of the monomer units of the polymer can result in a considerable increase in the viscosity of the polymer solution.

The object of the present invention was therefore to provide an economical process for the preparation of storage-stable polyamidoimide resins and coating materials, which does not have the abovementioned disadvantages.

SUMMARY AND DETAILED DESCRIPTION OF THE INVENTION

This object was achieved by providing a process for the preparation of storage-stable polyamidoimide resins, characterized in that the centers of the polyamidoimide resin which are reactive toward moisture are reacted with one or more compounds of the following general formula (I)

$$H—X—R^1 \qquad (I)$$

in which, X may be oxygen, and
   $R^1$ is a straight-chain or branched alkyl group having 1 to 8 carbon atoms,
   a straight-chain or branched ether or polyether group having 1 to 8 carbon atoms,
   a cycloalkyl group having 3 to 6 carbon atoms or
   an aralkyl group
   or where X may be $NR^2$, and
   $R^1$ is a straight-chain or branched alkyl group having 1 to 6 carbon atoms,
   a cycloalkyl group having 3 to 6 carbon atoms or
   an aralkyl group or
   an aryl group and
   $R^2$ is a straight-chain or branched alkyl group having 1 to 6 carbon atoms,
   an aralkyl group or
   an aryl group or
   $R^1$ and $R^2$
   together form a cycloalkyl radical having 4 or 5 methylene groups, and wherein the cycloalkyl redical may optionally have a methylene group replaced by oxygen or an $NR^3$ group, and $R^3$ being a straight-chain or branched alkyl group having 1 to 3 carbon atoms, and
   when X is oxygen, the reaction is carried out in the presence of at least one catalyst selected from the group consisting of organometallic catalysts and tertiary amines and at temperatures above 50° C. These catalysts may also be optionally employed when X is $NR^2$.

The following alcohols may be mentioned as examples of compounds in which X is oxygen: methanol, ethanol, n-propanol, isopropanol, n-butanol, isobutanol, tert-butanol, cyclohexanol, benzyl alcohol and phenylethyl alcohol. However, alcohols having one or more ether groups, such as, for example, methyldiglycol or butylglycol, may also be used.

The following secondary amines may be mentioned as examples of compounds in which X=NR$^2$: diethylamine, dibutylamine, N-methylcyclohexylamine, N-methylbenzylamine, morpholine, piperidine and N-methylpiperazine.

Compounds in which X is NR$^2$ are particularly preferably used, compounds which are preferred among these being those in which R$^2$ and R$^1$ form a cycloalkyl radical having 4 or 5 carbon atoms, it being possible for one of the methylene groups of the cycloalkyl radical to be replaced by oxygen or an NR$^3$ group, and R$^3$ being a straight-chain or branched alkyl group having 1 to 3 carbon atoms. Morpholine, piperidine and N-methylpiperazine are particularly preferred.

The process according to the invention is preferably carried out in the presence of at least one catalyst from the group consisting of the organometallic compounds and/or the tertiary amines. Tin-, zinc-, bismuth- or cobalt-based organometallic catalysts are particularly suitable, in particular dibutyltin dilaurate having good catalytic properties. In the case of the tertiary amines, both those which are completely inert when the process according to the invention is used and those which, in addition to their catalytic action, can be incorporated into the coating materials can be used as catalysts. The latter include, inter alia, butyraldehyde/aniline condensates, such as, for example, Vulkazit® 576 (Bayer AG, Leverkusen).

A process for the preparation of storage-stable polyamidoimide coating materials which makes use of the process according to the invention for the preparation of storage-stable polyamidoimide resins in that further coating material components are added before, during or after the preparation of the storage-stable polyamidoimide resins, and the further coating material components do not participate in the reaction, is furthermore provided.

The process according to the invention can therefore be carried out in a manner such that the reaction between the centers of the polyamidoimide which are reactive toward moisture and the compounds of the general formula (I), which is to be carried out in the preparation of the storage-stable coating material, is first carried out in the absence of further coating material components, only with the polyamidoimide, and the admixture of further coating material components is effected later on. However, it is also possible to carry out this reaction in the presence of further coating material components which do not intervene in the reaction.

As is evident, for example, from the enamel examples 1 to 3 mentioned below, the catalyst addition in the case of the reaction of the polyamidoimides with compounds of the general formula HNR$^1$R$^2$ can be effected in a temperature-independent manner, and it is even possible entirely to dispense with catalyst addition.

If, on the other hand, the polyamidoimides are reacted with compounds of the general formula HOR$^1$, the catalyzed reaction is effected at elevated temperatures, as shown by the comparison between the enamel 12 according to the invention and comparative enamel 2.

The invention furthermore relates to the storage-stable coating materials obtainable by the process according to the invention.

Below, examples of the preparation of polyamidoimide resins and coating materials according to the invention and examples of the process according to the invention for the preparation of storage-stable polyamidoimide coating materials are intended to serve for illustrating the invention.

EXAMPLES

Preparation of Polyamidoimide Resins

Polyamidoimide Resin 1

223.12 g of trimellitic anhydride are dissolved in 547.52 g of N-methylpyrrolidone with heating to 70 to 75° C., so that a clear solution forms. Cooling to 40° C. is then effected, and 6.07 g of 100% strength formic acid are mixed in. 293.52 g of 4,4'-diisocyanatodiphenylmethane (MDI) are slowly added and are dissolved thereby. It should be ensured that the temperature does not exceed 45° C. 33.09 g of N-methylpyrrolidone are then added. Thereafter, stirring for 1 hour at from 40 to 45° C. and heating to 85° C. in the course of 2 hours are carried out. Depending on $CO_2$ evolution, further heating is effected slowly to not more than 145° C., but, after reaching 100° C., the viscosity is determined several times with increasing reaction temperature until the desired resin viscosity is reached. The viscosity is determined using an efflux viscometer (4 mm DIN cup) according to DIN 53211 and, at a concentration of 90 g of resin per 60 N-methylpyrrolidone at 20° C., is about 110 s. At the same time, the NCO content is checked using customary methods. When the desired resin viscosity is reached, the reaction is stopped. 1000 g of a polyamidoimide resin solution are obtained.

Polyamidoimide Resin 2

The preparation of the polyamidoimide resin 2 corresponds to that of the polyamidoimide resin 1, except that, instead of 293.52 g of 4,4'-diisocyanatodiphenylmethane, 293.52 g of Suprasec® 1004, an isomer mixture comprising 2,4'- and 4,4'-diisocyanatodiphenylmethane in the concentration ratio of about 1:3, from Huntsmann International LLC., are used.

Preparation of the Enamels 1 to 13 According to the Invention and of the Comparative Enamels 1 and 2 based on polyamidoimide resins 1 and 2

Enamel 1:

2.5 g of Vulkazit 576® (Vulkazit is N,N-diphenyl guanidine, a reaction accelerator or catalyst sold by Bayer AG, Germany), and 24.6 g of morpholine are added to 705.43 g of the polyamidoimide resin solution obtained above for the polyamidoimide resin 1. Stirring is then effected for 1 hour at 125° C., after which 197.88 g of xylene, 112.69 g of N-methylpyrrolidone and 29.80 g of dimethylacetamide are diluted. The enamel is then filtered at a temperature of more than 50° C. through filter cartridges comprising phenol resin-laminated glass fiber fabrics having a pore size of about 5 μm. The nonvolatile residue of 1 g of enamel after drying for 1 hour at 180° C. gives the solids content mentioned below.

| Enamel data: | |
|---|---|
| Solids content (1 g/1 h/180° C.) of 35.6% | |
| Viscosity of 1850 mPa · s at 23° C. | |
| Enameling results (applied to 0.8 mm copper wire) | |
| Diameter increase according to DIN EN 60851-2: | 20 μm |
| Flexibility (0.8 mm) according to DIN EN 60851-3: | 30% |
| Hot penetration test according to DIN EN 60851-6: | 395° C. |
| Heat shock (0.5 h/220° C.) according to DIN EN 60851-6: | satisfactory |
| Tan-δ slope: | 194/258° C. |

Enamel 2:

24.6 g of morpholine are added at a temperature of 125° C. to 705.43 g of the polyamidoimide resin used in enamel 1, and stirring is effected for 1 h. Thereafter, 2.5 g of Vulkazit 576® are added at 50° C. and dilution is effected with 179.38 g of xylene, 55.69 g of N-methylpyrrolidone and 26.5 g of dimethylacetamide.

| Enamel data: | |
| --- | --- |
| Solids content (1 g/1 h/180° C.) of 35.8% | |
| Viscosity of 1780 mPa · s at 23° C. | |
| Enameling results (applied to 0.8 mm copper wire) | |
| Diameter increase according to DIN EN 60851-2: | 21 µm |
| Flexibility (0.8 mm) according to DIN EN 60851-3: | 30% |
| Hot penetration test according to DIN EN 60851-6: | 395° C. |
| Heat shock (0.5 h/220° C.) according to DIN EN 60851-6: | satisfactory |
| Tan-δ slope: | 195/264° C. |

Enamel 3:

24.6 g of morpholine are added at a temperature of 125° C. to 705.43 g of the polyamidoimide resin used in enamel 1, and stirring is effected for 1 h. Thereafter, dilution is effected with 202.38 g of xylene, 114.69 g of N-methylpyrrolidone and 29.8 g of dimethylacetamide.

| Enamel data: | |
| --- | --- |
| Solids content (1 g/1 h/180° C.) of 35.3% | |
| Viscosity of 1720 mPa · s at 23° C. | |
| Enameling results (applied to 0.8 mm copper wire) | |
| Diameter increase according to DIN EN 60851-2: | 21 µm |
| Flexibility (0.8 mm) according to DIN EN 60851-3: | 20% |
| Hot penetration test according to DIN EN 60851-6: | 400° C. |
| Heat shock (0.5 h/220° C.) according to DIN EN 60851-6: | satisfactory |
| Tan-δ slope: | 198/250° C. |

Enamel 4:

35.0 g of morpholine and 2.5 g of Vulkazit 576® are added at a temperature of 125° C. to 705.43 g of the polyamidoimide resin used in enamel 1, and stirring is effected for 1 h. Thereafter, dilution is effected with 179.38 g of xylene, 55.69 g of N-methylpyrrolidone and 26.5 g of dimethylacetamide.

| Enamel data: | |
| --- | --- |
| Solids content (1 g/1 h/180° C.) of 35.0% | |
| Viscosity of 1950 mPa · s at 23° C. | |
| Enameling results (applied to 0.8 mm copper wire) | |
| Diameter increase according to DIN EN 60851-2: | 22 µm |
| Flexibility (0.8 mm) according to DIN EN 60851-3: | 30% |
| Hot penetration test according to DIN EN 60851-6: | 385° C. |
| Heat shock (0.5 h/220° C.) according to DIN EN 60851-6: | satisfactory |
| Tan-δ slope: | 194/247° C. |

Enamel 5:

49.2 g of morpholine and 2.5 g of Vulkazit 576® are added at a temperature of 125° C. to 705.43 g of the polyamidoimide resin used in enamel 1, and stirring is effected for 1 h. Thereafter, dilution is effected with 179.38 g of xylene, 55.69 g of N-methylpyrrolidone and 26.5 g of dimethylacetamide.

| Enamel data: | |
| --- | --- |
| Solids content (1 g/1 h/180° C.) of 35.3% | |
| Viscosity of 2200 mPa · s at 23° C. | |
| Enameling results (applied to 0.8 mm copper wire) | |
| Diameter increase according to DIN EN 60851-2: | 20 µm |
| Flexibility (0.8 mm) according to DIN EN 60851-3: | 30% |
| Hot penetration test according to DIN EN 60851-6: | 400° C. |
| Heat shock (0.5 h/220° C.) according to DIN EN 60851-6: | satisfactory |
| Tan-δ slope: | 197/254° C. |

Enamel 6:

20.9 g of isobutanol and 2.5 g of Vulkazit 576® are added at a temperature of 125° C. to 705.43 g of the polyamidoimide resin used in enamel 1, and stirring is effected for 1 h. Thereafter, dilution is effected with 179.38 g of xylene, 55.69 g of N-methylpyrrolidone and 26.5 g of dimethylacetamide.

| Enamel data: | |
| --- | --- |
| Solids content (1 g/1 h/180° C.) of 34.6% | |
| Viscosity of 1400 mPa · s at 23° C. | |
| Enameling results (applied to 0.8 mm copper wire) | |
| Diameter increase according to DIN EN 60851-2: | 19 µm |
| Flexibility (0.8 mm) according to DIN EN 60851-3: | 20% |
| Hot penetration test according to DIN EN 60851-6: | 410° C. |
| Heat shock (0.5 h/220° C.) according to DIN EN 60851-6: | satisfactory |
| Tan-δ slope: | 194/257° C. |

Enamel 7:

28.3 g of N-methylpiperazine and 2.5 g of Vulkazit 576® are added at a temperature of 125° C. to 705.43 g of the polyamidoimide resin used in enamel 1, and stirring is effected for 1 h. Thereafter, dilution is effected with 179.38 g of xylene, 55.69 g of N-methylpyrrolidone and 26.5 g of dimethylacetamide.

| Enamel data: | |
| --- | --- |
| Solids content (1 g/1 h/180° C.) of 35.7% | |
| Viscosity of 2330 mPa · s at 23° C. | |
| Enameling results (applied to 0.8 mm copper wire) | |
| Diameter increase according to DIN EN 60851-2: | 18 µm |
| Flexibility (0.8 mm) according to DIN EN 60851-3: | 25% |
| Hot penetration test according to DIN EN 60851-6: | 410° C. |
| Heat shock (0.5 h/220° C.) according to DIN EN 60851-6: | satisfactory |
| Tan-δ slope: | 205/245° C. |

Enamel 8:

24.0 g of piperidine and 2.5 g of Vulkazit 576® are added at a temperature of 125° C. to 705.43 g of the polyamidoimide resin used in enamel 1, and stirring is effected for 1 h. Thereafter, dilution is effected with 179.38 g of xylene, 55.69 g of N-methylpyrrolidone and 26.5 g of dimethylacetamide.

Enamel data:

Solids content (1 g/1 h/180° C.) of 34.7%
Viscosity of 2250 mPa · s at 23° C.
Enameling results (applied to 0.8 mm copper wire)
| | |
|---|---|
| Diameter increase according to DIN EN 60851-2: | 20 μm |
| Flexibility (0.8 mm) according to DIN EN 60851-3: | 25% |
| Hot penetration test according to DIN EN 60851-6: | 410° C. |
| Heat shock (0.5 h/220° C.) according to DIN EN 60851-6: | satisfactory |
| Tan-δ slope: | 198/242° C. |

Enamel 9:

28.3 g of cyclohexanol and 2.5 g of Vulkazit 576® are added at a temperature of 125° C. to 705.43 g of the polyamidoimide resin used in enamel 1, and stirring is effected for 1 h. Thereafter, dilution is effected with 179.38 g of xylene, 55.69 g of N-methylpyrrolidone and 26.5 g of dimethylacetamide.

Enamel data:

Solids content (1 g/1 h/180° C.) of 34.9%
Viscosity of 2150 mPa · s at 23° C.
Enameling results (applied to 0.8 mm copper wire)
| | |
|---|---|
| Diameter increase according to DIN EN 60851-2: | 20 μm |
| Flexibility (0.8 mm) according to DIN EN 60851-3: | 20% |
| Hot penetration test according to DIN EN 60851-6: | 415° C. |
| Heat shock (0.5 h/220° C.) according to DIN EN 60851-6: | satisfactory |
| Tan-δ slope: | 210/258° C. |

Enamel 10:

33.9 g of methyldiglycol and 2.5 g of Vulkazit 576® are added at a temperature of 125° C. to 705.43 g of the polyamidoimide resin used in enamel 1, and stirring is effected for 1 h. Thereafter, dilution is effected with 179.38 g of xylene, 55.69 g of N-methylpyrrolidone and 26.5 g of dimethylacetamide.

Enamel data:

Solids content (1 g/1 h/180° C.) of 33.7%
Viscosity of 1700 mPa · s at 23° C.
Enameling results (applied to 0.8 mm copper wire)
| | |
|---|---|
| Diameter increase according to DIN EN 60851-2: | 25 μm |
| Flexibility (0.8 mm) according to DIN EN 60851-3: | 25% |
| Hot penetration test according to DIN EN 60851-6: | 405° C. |
| Heat shock (0.5 h/220° C.) according to DIN EN 60851-6: | satisfactory |
| Tan-δ slope: | 197/255° C. |

Enamel 11:

33.4 g of butylglycol and 2.5 g of Vulkazit 576® are added at a temperature of 125° C. to 705.43 g of the polyamidoimide resin used in enamel 1, and stirring is effected for 1 h. Thereafter, dilution is effected with 179.38 g of xylene, 55.69 g of N-methylpyrrolidone and 26.5 g of dimethylacetamide.

Enamel data:

Solids content (1 g/1 h/180° C.) of 34.3%
Viscosity of 1930 mPa · s at 23° C.
Enameling results (applied to 0.8 mm copper wire)
| | |
|---|---|
| Diameter increase according to DIN EN 60851-2: | 20 μm |
| Flexibility (0.8 mm) according to DIN EN 60851-3: | 20% |
| Hot penetration test according to DIN EN 60851-6: | 420° C. |
| Heat shock (0.5 h/220° C.) according to DIN EN 60851-6: | satisfactory |
| Tan-δ slope: | 202/263° C. |

Enamel 12:

30.5 g of benzyl alcohol and 2.5 g of Vulkazit 576® are added at a temperature of 125° C. to 705.43 g of the polyamidoimide resin used in enamel 1, and stirring is effected for 1 h. Thereafter, dilution is effected with 179.38 g of xylene, 55.69 g of N-methylpyrrolidone and 26.5 g of dimethylacetamide.

Enamel data:

Solids content (1 g/1 h/180° C.) of %
Viscosity of mPa · s at 23° C.
Enameling results (applied to 0.8 mm copper wire)
| | |
|---|---|
| Diameter increase according to DIN EN 60851-2: | 20 μm |
| Flexibility (0.8 mm) according to DIN EN 60851-3: | 25% |
| Hot penetration test according to DIN EN 60851-6: | 400° C. |
| Heat shock (0.5 h/220° C.) according to DIN EN 60851-6: | satisfactory |
| Tan-δ slope: | 207/256° C. |

Enamel 13:

34.17 g of N-methylbenzylamine and 5 g of dibutyltin dilaurate are added at a temperature of 125° C. to 705.43 g of the polyamidoimide resin from example 1, and stirring is effected for 1 h. Thereafter, dilution is effected with 205.38 g of xylene, 110.69 g of N-methylpyrrolidone and 30.5 g of dimethylacetamide.

Enamel data:

Solids content (1 g/1 h/180° C.) of 35.3%
Viscosity of 2300 mPa · s at 23° C.
Enameling results (applied to 0.8 mm copper wire)
| | |
|---|---|
| Diameter increase according to DIN EN 60851-2: | 22 μm |
| Flexibility (0.8 mm) according to DIN EN 60851-3: | 25% |
| Hot penetration test according to DIN EN 60851-6: | 395° C. |
| Heat shock (0.5 h/220° C.) according to DIN EN 60851-6: | satisfactory |
| Tan-δ slope: | 191/243° C. |

Comparative Enamel 1:

2.24 g of Vulkazit 576 are added at <50° C. to 633.1 g of the polyamidoimide resin from example 1, and dilution is effected with 191.5 g of xylene, 125.6 g of N-methylpyrrolidone and 47.6 g of dimethylacetamide.

| Enamel data: | |
|---|---|
| Solids content (1 g/1 h/180° C.) of 35.3% | |
| Viscosity of 1750 mPa · s at 23° C. | |
| Enameling results (applied to 0.8 mm copper wire) | |
| Diameter increase according to DIN EN 60851-2: | 22 µm |
| Flexibility (0.8 mm) according to DIN EN 60851-3: | <10% |
| Hot penetration test according to DIN EN 60851-6: | 380° C. |
| Heat shock (0.5 h/220° C.) according to DIN EN 60851-6: | satisfactory |
| Tan-δ slope: | 191/243° C. |

Comparative Enamel 2:

30.6 g of benzyl alcohol are added at a temperature of 125° C. to 705.43 g of the polyamidoimide resin from example 1, and stirring is effected for 1 h. Thereafter, 2.5 g of Vulkazit 576 are added at <50° C. and dilution is effected with 179.38 g of xylene, 55.69 g of N-methylpyrrolidone and 26.5 g of dimethylacetamide.

| Enamel data: | |
|---|---|
| Solids content (1 g/1 h/180° C.) of 35.4% | |
| Viscosity of 1670 mPa · s at 23° C. | |
| Enameling results (applied to 0.8 mm copper wire) | |
| Diameter increase according to DIN EN 60851-2: | 22 µm |
| Flexibility (0.8 mm) according to DIN EN 60851-3: | 25% |
| Hot penetration test according to DIN EN 60851-6: | 405° C. |
| Heat shock (0.5 h/220° C.) according to DIN EN 60851-6: | satisfactory |
| Tan-δ slope: | 197/248° C. |

Method for Checking the Residual Reactivity of the Polyamidoimide Enamels According to the Invention and of the Comparative Enamels The method for checking the residual activity of the polyamidoimide coating materials according to the invention and of the polyamidoimide enamels is a further aspect of the present invention. By means of the method described below, it is possible for the first time to reliably determine the storage stability with circumvention of a tedious test which takes several weeks.

This is possible by determining the development of the viscosity of the test enamels after addition of an amount of a primary diamine in an organic solvent and recording the viscosity increase as a function of time.

In principle, the method is not limited either to certain primary diamines or organic solvents, or to certain reaction temperatures. However, it is advantageous to employ economical diamines, such as, for example, ethylenediamine, and to use enamel solvents, such as, for example, N-methylpyrrolidone. The reaction itself can be effected at room temperature but is accelerated by increasing the temperature. Thus, by simple variation of parameters, such as the temperature, the solvent or diamine, it is possible to establish in a system-specific manner an investigation time window which, within a few minutes, gives results which correlate well with the results which were available before by conventional methods only after storage for several weeks.

The investigation method according to the invention is explained by way of example with reference to the investigation of the storage stability of the polyamidoimide coating materials according to the invention.

In order to check the residual reactivity of the polyamidoimide enamels according to the invention, 10 g of the respective enamel are homogeneously mixed with 1.75 g of a 10% strength solution of ethylenediamine in N-methylpyrrolidone, and the development of the viscosity of this mixture at room temperature is recorded as a function of the measuring time (FIG. 1).

The system used consists of the viscometer of the type VT 550 from Haake and the cone-and-plate measuring system PK 5/1°. The times which, owing to the reaction between the still present reactive centers of the respective polyamidoimides, lead to a viscosity of 60 Pa·s are measured as comparative values.

In principle, it is also possible—as in the case of conventional methods—to measure the viscosity after a fixed time and then to compare the viscosities.

The following table 1 shows, as an overview, the differences between the enamels 1 to 13 and the comparative enamels 1 and 2, "+" meaning that the respective component is contained in the polyamidoimide resin or the enamel.

TABLE 1

| | Benzyl alcohol | Morpholine | Isobutanol | N-Methyl-piperazine | N-Methyl-benzylamine | Piperidine | Cyclo-hexanol | Methyl-diglycol | Butylglycol | Dibutyltin dilaurate | Vulkazit 576 |
|---|---|---|---|---|---|---|---|---|---|---|---|
| Enamel 1 | | + | | | | | | | | | + |
| Enamel 2 | | + | | | | | | | | | +[1] |
| Enamel 3 | | + | | | | | | | | | |
| Enamel 4 | | + | | | | | | | | | + |
| Enamel 5 | | + | | | | | | | | | + |
| Enamel 6 | | | + | | | | | | | | + |
| Enamel 7 | | | | + | | | | | | | + |
| Enamel 8 | | | | | | + | | | | | + |
| Enamel 9 | | | | | | | + | | | | + |
| Enamel 10 | | | | | | | | + | | | + |
| Enamel 11 | | | | | | | | | + | | + |
| Enamel 12 | + | | | | | | | | | | + |
| Enamel 13 | | | | | + | | | | | + | |
| Comp. enamel 1 | | | | | | | | | | | +[1] |
| Comp. enamel 2 | + | | | | | | | | | | +[1] |

[1]Catalyst added at <50° C.

Table 2 shows the properties of the polyamidoimide resin solutions and of the applied enamels.

TABLE 2

|  | Viscosity of the resin solution (3 parts resin + 2 parts NMP) [mPa·s] | Solids content (1 g/1 h/ 180° C.) [%] | Viscosity of the enamel at 23° C. [mPa·s] | Checking of the residual reactivity Standardized reaction time until 60 Pa·s is reached [sec] |
|---|---|---|---|---|
| Enamel 1 | 535 | 35.6 | 1850 | 516 |
| Enamel 2 | 540 | 35.8 | 1780 | 556 |
| Enamel 3 | 535 | 35.3 | 1720 | 448 |
| Enamel 4 | 540 | 35.0 | 1950 | 1203 |
| Enamel 5 | 560 | 35.3 | 2200 | 1536 |
| Enamel 6 | 553 | 34.6 | 1400 | not determined |
| Enamel 7 | 540 | 35.7 | 2330 | 572 |
| Enamel 8 | 565 | 34.7 | 2250 | 345 |
| Enamel 9 | 540 | 34.9 | 2150 | not determined |
| Enamel 10 | 550 | 33.7 | 1700 | 498 |
| Enamel 11 | 545 | 34.3 | 1930 | not determined |
| Enamel 12 | 550 | 34.4 | 1870 | 220 |
| Enamel 13 | 580 | 35.3 | 2300 | 235 |
| Comparative enamel 1 | 565 | 35.3 | 1750 | 64 |
| Comparative enamel 2 | 530 | 35.4 | 1670 | 151 |

The reduced residual reactivity is evident for all enamels according to the invention, in particular for the enamels 4 and 5.

Enameling Example

The enamels 1 to 5 and the comparative enamels 1 and 2 were applied to 0.8 mm copper wire as an overcoat by means of the conventional wire enamel coating process, with a THEIC-modified polyesterimide as a base coat. Here, the base coat was applied in six cycles and the overcoat in four cycles.

The application data of enamels and comparative enamels are shown in table 3.

TABLE 3

|  | Speed [m/min] | Thickness of polyamidoimide enamel coat [μm] | Surface characteristics | Flexibility (1 × D; after preextension) [%] | Softening temp. test Lüscher [° C.] | Heat shock (220° C., 2 × D) | Slope of the tan-δ curve at [° C.] | Styrene test (3 min) [Cracks/curls] |
|---|---|---|---|---|---|---|---|---|
| Enamel 1 | 30 | 20 | satisfact. | 30 | — | satisfact. | 204/245 | 3 |
|  | 35 | 20 | satisfact. | 30 | 395 | satisfact. | 194/258 | 3 |
|  | 40 | 20 | satisfact. | 30 | — | satisfact. | 166/226 | 2 |
| Enamel 2 | 30 | 21 | satisfact. | 30 | — | satisfact. | 203/264 | 7 |
|  | 35 | 21 | satisfact. | 30 | 395 | satisfact. | 195/264 | 6 |
|  | 40 | 20 | satisfact. | 30 | — | satisfact. | — | 6 |
| Enamel 3 | 30 | 20 | satisfact. | 30 | — | satisfact. | 206/253 | 0 |
|  | 35 | 21 | satisfact. | 20 | 400 | satisfact. | 198/250 | 0 |
|  | 40 | 20 | satisfact. | 20 | — | satisfact. | 170/235 | 0 |
| Enamel 4 | 30 | 22 | satisfact. | 30 | — | satisfact. | 208/248 | 0 |
|  | 35 | 22 | satisfact. | 30 | 385 | satisfact. | 194/247 | 0 |
|  | 40 | 22 | satisfact. | 30 | — | satisfact. | 162/212 | 0 |
| Enamel 5 | 30 | 20 | satisfact. | 30 | — | satisfact. | 204/263 | 0 |
|  | 35 | 20 | satisfact. | 30 | 400 | satisfact. | 197/254 | 0 |
|  | 40 | 21 | satisfact. | 20 | — | satisfact. | 176/222 | 0 |
| Enamel 6 | 30 | 20 | satisfact. | 20 | — | satisfact. | 213/264 | 0 |
|  | 35 | 20 | satisfact. | 20 | 410 | satisfact. | 194/257 | 0 |
|  | 40 | 20 | satisfact. | 20 | — | satisfact. | 173/224 | 0 |
| Enamel 7 | 30 | 19 | satisfact. | 25 | — | satisfact. | 213/265 | 0 |
|  | 35 | 18 | satisfact. | 25 | 410 | satisfact. | 205/245 | 3 |
|  | 40 | 19 | satisfact. | 25 | — | satisfact. | 181/223 | 20 |
| Enamel 8 | 30 | 19 | satisfact. | 15 | — | satisfact. | 207/259 | 0 |
|  | 35 | 20 | satisfact. | 25 | 410 | satisfact. | 198/242 | 0 |
|  | 40 | 20 | satisfact. | 25 | — | satisfact. | 163/192 | 20 |
| Enamel 9 | 30 | 20 | satisfact. | 20 | — | satisfact. | 217/271 | 3 |
|  | 35 | 20 | satisfact. | 20 | 415 | satisfact. | 210/258 | 8 |
|  | 40 | 20 | satisfact. | 20 | — | satisfact. | 172/221 | 30 |
| Enamel 10 | 30 | 25 | satisfact. | 25 | — | satisfact. | 205/263 | 0 |
|  | 35 | 25 | satisfact. | 25 | 405 | satisfact. | 197/255 | 0 |
|  | 40 | 25 | satisfact. | 25 | — | satisfact. | 179/251 | 0 |
| Enamel 11 | 30 | 18 | satisfact. | 10 | — | satisfact. | 221/250 | 0 |
|  | 35 | 20 | satisfact. | 20 | 420 | satisfact. | 202/263 | 0 |
|  | 40 | 20 | satisfact. | 25 | — | satisfact. | 177/239 | 0 |
| Enamel 12 | 30 | 20 | satisfact. | 30 | — | satisfact. | 207/247 | 4 |
|  | 35 | 20 | satisfact. | 25 | 400 | satisfact. | 207/256 | 5 |
|  | 40 | 21 | satisfact. | 30 | — | satisfact. | 181/253 | 5 |
| Enamel 13 | 30 | 21 | satisfact. | 20 | — | satisfact. | 205/261 | 0 |
|  | 35 | 22 | satisfact. | 25 | 395 | satisfact. | 191/243 | 2 |
|  | 40 | 22 | satisfact. | 20 | — | satisfact. | 164/198 | 2 |

TABLE 3-continued

|  | Speed [m/min] | Thickness of polyamidoimide enamel coat [μm] | Surface characteristics | Flexibility (1 × D; after preextension) [%] | Softening temp. test Lüscher [° C.] | Heat shock (220° C., 2 × D) | Slope of the tan-δ curve at [° C.] | Styrene test (3 min) [Cracks/curls] |
|---|---|---|---|---|---|---|---|---|
| Comp. enamel 1 | 30 | 18 | satisfact. | 20 | — | satisfact. | 199/251 | 0 |
|  | 35 | 20 | satisfact. | <10 | 380 | satisfact. | 191/243 | 8 |
|  | 40 | 18 | satisfact. | <10 | — | satisfact. | 170/212 | 30 |
| Comp. enamel 2 | 30 | 22 | satisfact. | 20 | — | satisfact. | 209/251 | 0 |
|  | 35 | 22 | satisfact. | 25 | 405 | satisfact. | 197/248 | 0 |
|  | 40 | 20 | satisfact. | 20 | — | satisfact. | 171/219 | 0 |

The invention claimed is:

1. A process for the preparation of storage-stable polyamidoimide resins, comprising reacting free isocyanate, isoimide, allophanate, biuret, uretdione, carboxylic anhydride or blocked isocyanate groups of the polyamidoimide resins which are reactive toward moisture, with one or more compounds of the following formula (I)

H—X—R¹          (I)

in the absence of moisture,
wherein:
X is $NR^2$, and
R¹ is a straight-chain or branched alkyl group having 1 to 6 carbon atoms, a cycloalkyl group having 3 to 6 carbon atoms or an aralkyl group or an aryl group; and,
R² is a straight-chain or branched alkyl group having 1 to 6 carbon atoms, an aralkyl group or an aryl group; or
R¹ and R² together form a cycloalkyl radical having 4 or 5 methylene groups, and wherein the cycloalkyl radical optionally has a methylene group replaced by oxygen or an $NR^3$ group, and R³ being a straight-chain or branched alkyl group having 1 to 3 carbon atoms, and the reaction can be carried out in a temperature independent manner and optionally in the presence of an organometallic or tertiary amine catalyst.

2. The process as claimed in claim 1, wherein the compound of formula I is selected from the group consisting of morpholine, piperidine, N-methylpiperidine, and N-methylbenzylamine.

3. The process as claimed in claim 1 wherein the reaction is carried out in the presence of at least one catalyst selected from the group consisting of organometallic catalysts and tertiary amines.

4. The process as claimed in claim 1 wherein the reaction is carried out in the presence of at least one catalyst selected from the group consisting of dibutyltin dilaurate and butyraldehyde/aniline condensates.

5. The process as claimed in claim 1 wherein the reaction is carried out at temperatures above 50° C.

6. A polyamidoimide resin produced by the process of claim 1.

* * * * *